United States Patent [19]

Kelly, 3rd et al.

[11] Patent Number: 4,730,213

[45] Date of Patent: Mar. 8, 1988

[54] METHOD MEASURING TRANSPARENT ELEMENTS AND AN OPAQUE MEDIUM

[75] Inventors: Daniel T. Kelly, 3rd, Ephrata; Evo Andreatti, Jr., Rheems; Frank S. Krufka, Mount Joy, all of Pa.

[73] Assignee: RCA Corporation, Princeton, N.J.

[21] Appl. No.: 856,008

[22] Filed: Apr. 25, 1986

[51] Int. Cl.$^4$ .................. H04N 7/18; H04N 17/00
[52] U.S. Cl. .................. 358/107; 358/106; 358/101; 358/10; 356/239
[58] Field of Search ............... 358/101, 106, 107, 139, 358/10; 356/239; 445/11, 37, 47, 68

[56] References Cited

U.S. PATENT DOCUMENTS

| | | | |
|---|---|---|---|
| 4,525,735 | 6/1985 | Krufka | 358/10 |
| 4,556,902 | 12/1985 | Krufka | 358/107 |
| 4,589,139 | 5/1986 | Hasla et al. | 358/107 |
| 4,684,982 | 8/1987 | Krufka | 358/107 |
| 4,692,943 | 9/1987 | Pietzseh et al. | 358/107 |
| 4,696,047 | 9/1987 | Christian et al. | 358/107 |

Primary Examiner—James J. Groody
Assistant Examiner—John K. Peng
Attorney, Agent, or Firm—E. M. Whitacre; D. H. Irlbeck; L. L. Hallacher

[57] ABSTRACT

In measuring the dots of a color picture tube panel the panel is scanned and energy passing through the dots is detected. A large number of lines are scanned and the scan data are stored in a matrix having a row for each scan line and, columns for the dots and the spaces between the dots. Data for a preselected number of dots and spaces are stored. When scanning occurs between rows of dots, the preselected number of dots is not scanned and zeros are put into the matrix. Data processing is simplified by searching the last column of the matrix for zeros and rejecting all rows of data having a zero in that column.

11 Claims, 7 Drawing Figures

METHOD MEASURING TRANSPARENT ELEMENTS AND AN OPAQUE MEDIUM

BACKGROUND

This invention relates generally to the measurement of transparent elements in an opaque medium and particularly to the measurement of the transparent dots in a kinescope faceplate panel, or shadow mask.

During the production of picture tubes for color television receivers, a black matrix material is applied to the inside surface of the faceplate panels. The black matrix coating includes a large number of transparent dots which are arranged in a particular pattern. The transparent dots are coated with slurries of photosensitive materials including phosphors which emit the three primary colors of light when impacted by electrons. The phosphors are alternately applied in a repetitive sequence such as red green blue, to the transparent dots. Prior to the application of the phosphors, it is desirable to measure the widths of the transparent dots, and the opaque matrix spaces between the dots, to verify that they are within acceptable dimensional tolerances to avoid the expensive application of phosphors to improperly matrixed panels.

In order to measure the transparent dots, and the opaque spaces between the dots, the faceplate panel is placed between a stationary light source and a detector enabling light to pass through the dots to the detector. Portions of the panel are scanned with light and variations caused by the opaque spaces and the transparent dots are detected and provided to a measuring system.

Typically, the detector is a photosensitive solid state device such as a linear photodiode array or a CCD. The pixels of the array are charged to various levels in accordance with the amount of light impacting the individual pixels. A camera is used to focus the matrix dot pattern onto the array. The camera lens focuses and magnifies the image so that each dot spans a large number of detector pixels. Scanning is affected by rotating a galvo to change the portion of the dot pattern which is focused onto the array. The pixel charge levels are periodically clocked out to effectively scan a large number of lines across the dot pattern. The dots are aligned in rows and scanning is parallel to the rows. Accordingly some scanning occurs between rows of dots and no useful data is provided for such scans. The analog signals from the photodiode array are digitized and provided to a storage device within the measuring system. Data from all the scan lines must be provided to the storage device and, accordingly, the unusable data obtained from scanning between the rows of dots are also provided to the storage. For this reason there is a need for a method for rapidly identifying unuseful data to avoid processing such data and to speed up the processing of useful data. The present invention fulfills this need.

CROSS-REFERENCE TO RELATED APPLICATIONS

U.S. application Ser. No. 834,388 filed Feb. 28, 1986, by Frank S. Krufka entitled "Multiple Array Panel Matrix Measurement System" now U.S. Pat. No. 4,684,982 describes an interface with which the present invention can be used. The teachings of this application are incorporated herein by reference.

SUMMARY

A method of measuring the dimensions of, and spaces between, transparent elements arranged in a pattern in an opaque medium includes the steps of placing the medium between an energy source and an array of pixels responsive to the energy and illuminating the medium. The array is scanned with the energy in a plurality of scan lines whereby pixels receiving energy passing through the transparent elements charge to a first charge level and pixels shaded by the medium charge to a second charge level. The charge levels are detected and an analog signal having amplitude levels indicative of the charge levels and pulse widths indicative of a dimension of the transparent elements and the spaces between the elements is produced. The analog signal is converted to a digital signal having first and second pulse levels in accordance with the amplitude levels, whereby the dimensions are represented by pixel counts. The pixel counts for a selected number of the transparent elements, and for an equal number of spaces between the elements are transferred to a storage means. Zeros are transferred to the storage means where the number of transparent elements is less than the selected number. The pixel counts are stored in a matrix wherein the pixel counts for each of the scan lines form a row and the pixel counts of the transparent elements and each of the spaces are aligned as columns, one of the columns has a succession of zeros when the number of transparent elements is less than the selected number. One of the columns is investigated for zeros and rows having a zero are rejected, and rows having a pixel count in one column are accepted.

DETAILED DESCRIPTION

Figure 1:
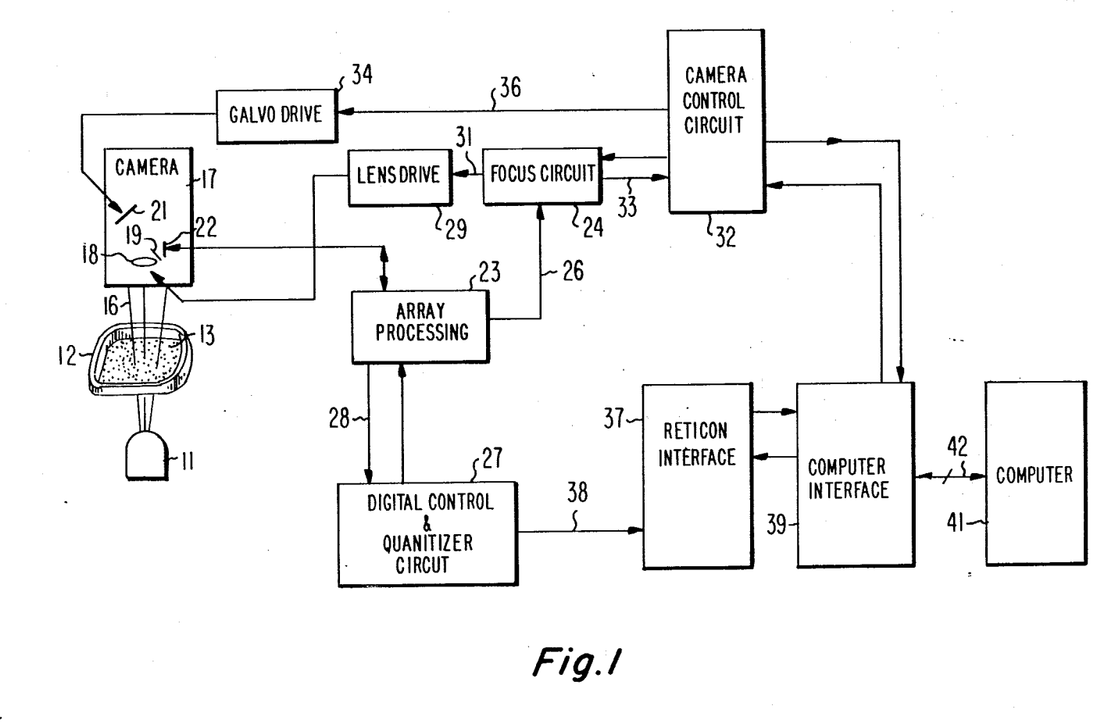
FIG. 1 is a simplified block diagram of a system in which the present invention can be used.
Figure 2:
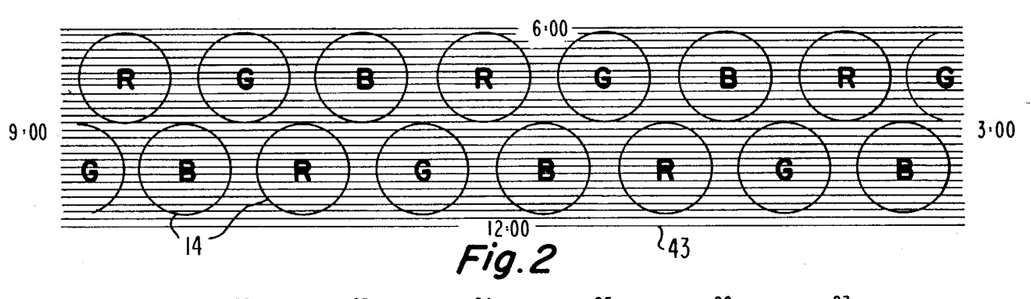
FIG. 2 shows how the dot pattern on a faceplate panel is arranged and scanned.

In FIG. 1, a light source 11 illuminates a color picture tube panel 12 having a black matrix coating 13 on the inside surface. The matrix coating 13 includes a large number of transparent elements arranged in a pattern, as illustrated in FIG. 2. In a finished tube, the transparent elements are coated with phosphors which emit different colors of light when impacted by electrons. The phosphor dots are arranged in horizontal rows and are staggered vertically. Light rays 16 from the source 11 are received by a camera 17, which includes a focusing lens 18, a fixed mirror 19, a scanning galvo mirror 21 and a photodetector array 22. The photodetector array can be a photodiode, such as a model 1728 photodetector available from EG&G Reticon and as such has 1728 pixels which are individually responsive to light energy. Thus, as the light rays 16 pass through the transparent elements where the phosphor dots 14 (FIG. 2) are to be applied, the pixels of the photodetector array 22 which receive light from the transparent elements, are charged to one level while those which coincide with the opaque black matrix material between the dots are charged to a different level. The energy levels from the individual pixels of the photodetector array 22 are fed to an array processing circuit 23 which is supplied by the vendor of the photodetector array. The array processing circuit 23 provides an analog video signal to a focus circuit 24 via a line 26 and also to a digital control and quantizing circuit 27 via a line 28. The digital control and quantizing circuit 27 converts the analog video signal into a digital signal and also quantizes the analog signal at a selected percentage. The output of the focus circuit 24 is provided to a lens drive 29 via a line 31 and also to a camera control circuit 32 via a line 33. The output of the camera control circuit 32 is provided to a galvo drive 34 via a line 36. The output of the digital control and quantizer circuit 27 is provided to a reticon interface 37 via a line 38. The reticon interface 37 communicates, through a computer interface 39, with a computer 41 by way of a 16 conductor cable 42, which serves as the control and data lines between the interface 39 and the computer 41. The computer 41 can be a model HP9836 available from Hewlett-Packard and the interface 39 can be a model HP6940B also available from Hewlett-Packard. The interface 37 is described in U.S. application Ser. No. 834,388 fully referenced hereinabove.

In operation, the panel 12 is placed between the light source 11 and the camera 17 and the camera is focused to image the transparent dots 14 onto the pixels of the sensor 22. The lensing system of the camera magnifies the transparent elements and each element is imaged onto a large number of pixels within the array. The size of the pixels and the magnification factor are known and therefore the number of pixels illuminated through a dot is an accurate measurement of the dot. The camera control circuit 32 applies a ramp voltage to the galvo drive 34 to rotate galvo 21 and cause the portion of the pattern imaged on the array to change. The charge levels on the individual pixels of the array 22 are clocked out at a rapid rate and fed to the computer 41 by way of the digital control and quantizer circuit 27 and the interface circuits 37 and 39. The rapid clocking of the charge levels from the photodetector pixels has the affect of scanning a plurality of scan lines across the dot pattern. The data from each scan line are stored as a data row in the computer memory.

As shown in FIG. 2, the light transparent elements, or dots 14, are arranged in a repetitive pattern, such as red, green, blue, red, green, blue. The motion of the galvo 21 causes the image to move in the six o'clock to twelve o'clock direction. The pixel readings are clocked out at a rate and a scan line 43 is produced for each of the clocking intervals. Thus, each scan line represents a slice across the matrix pattern, and the dimensions of the slice are determined by the characteristics of the scanning system. For example, each scan line can have a width of about 0.05 mils in the six o'clock to twelve o'clock direction. The distance covered in the three o'clock to nine o'clock direction can be in the order of 80 mils. A large number of scans, such as 200, is made to cover an area of approximately 10 mils. Accordingly, 200 slices of the pattern are seen by the array and the total portion of the pattern quantized is an area of 10 mils by 80 mils.

Figure 3:
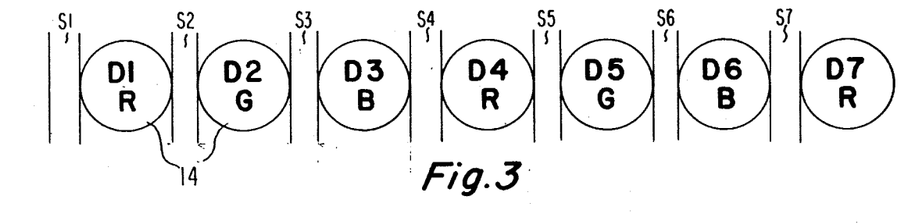
FIG. 3 shows how the data from one row of dots and spaces between the dots are provided to the system.
Figure 4:
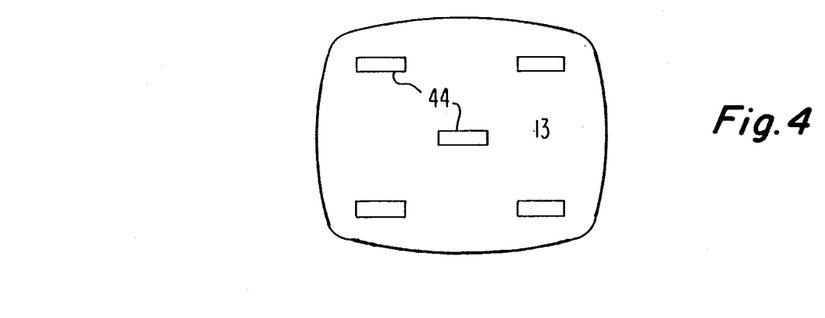
FIG. 4 shows how a plurality of locations on a faceplate panel are scanned.

The resolution and color quality of the picture tube, including the panel being measured, will be acceptable only when the diameters of the light transparent elements 14 and the spaces between the elements are within acceptable limits. Accordingly, as shown in FIG. 3, the goal is the measurement of the diameter of the dots D1 through D7 and the spaces S1 through S7 between the dots. As stated in the example above, scanning in the six o'clock to twelve o'clock direction can cover approximately 10 mils. For some tube types, the dots 14 have a diameter of approximately 4.5 mils. Accordingly, 200 scans can cover as many as 2 rows of dots. The row of dots shown in FIG. 3 is illustrative of one row of dots, but the same data processing occurs for all rows of dots. Additionally, the system includes five of the cameras and scanning simultaneously occurs at five locations 44 on the faceplate 12, as shown in FIG. 4. Data for each of the measuring locations 44 are stored by the computer 41 in a matrix wherein each of the scan lines 43 is a row of data, and the spaces S1 through S7 and the dots D1 through D7, respectively, form seven columns of space data and seven columns of dot data, even although the dots and spaces in adjacent rows within the pattern are offset and, thus, are not aligned in columns. A portion of the data matrix for one of the scanning locations 44 is shown in the following Table.

TABLE

| S1 | D1 | S2 | D2 | S3 | D3 | S4 | D4 | S5 | D5 | S6 | D6 | S7 | D7 |
|---|---|---|---|---|---|---|---|---|---|---|---|---|---|
| 64 | 0 | 176 | 0 | 0 | 0 | 0 | 0 | 64 | 0 | 232 | 0 | 0 | 0 |
| 80 | 0 | 168 | 9 | 0 | 0 | 0 | 0 | 80 | 0 | 224 | 9 | 0 | 0 |
| 19 | 28 | 115 | 16 | 0 | 0 | 0 | 0 | 19 | 28 | 171 | 16 | 0 | 0 |
| 147 | 20 | 120 | 35 | 109 | 19 | 0 | 0 | 0 | 0 | 120 | 35 | 164 | 0 |
| 236 | 27 | 117 | 34 | 112 | 41 | 102 | 23 | 0 | 0 | 0 | 0 | 112 | 0 |
| 90 | 24 | 118 | 35 | 111 | 40 | 104 | 49 | 97 | 25 | 0 | 0 | 0 | 0 |
| 205 | 18 | 117 | 36 | 109 | 42 | 104 | 47 | 98 | 54 | 93 | 27 | 0 | 0 |
| 56 | 17 | 124 | 30 | 111 | 41 | 105 | 46 | 100 | 51 | 95 | 56 | 91 | 0 |
| 175 | 22 | 123 | 30 | 113 | 39 | 106 | 45 | 100 | 52 | 95 | 55 | 91 | 65 |
| 12 | 23 | 120 | 33 | 113 | 38 | 107 | 45 | 100 | 51 | 95 | 56 | 91 | 59 |
| 119 | 26 | 119 | 32 | 113 | 39 | 107 | 44 | 102 | 49 | 96 | 55 | 91 | 59 |
| 228 | 24 | 120 | 33 | 111 | 40 | 106 | 45 | 102 | 49 | 97 | 53 | 93 | 58 |
| 80 | 26 | 119 | 32 | 113 | 39 | 106 | 44 | 102 | 49 | 98 | 53 | 93 | 57 |
| 91 | 33 | 112 | 39 | 106 | 45 | 101 | 49 | 97 | 53 | 95 | 56 | 90 | 60 |
| 73 | 39 | 107 | 44 | 102 | 48 | 98 | 52 | 94 | 56 | 91 | 60 | 87 | 63 |
| 70 | 44 | 102 | 49 | 97 | 53 | 94 | 56 | 91 | 58 | 89 | 62 | 84 | 66 |
| 68 | 48 | 98 | 53 | 93 | 57 | 91 | 58 | 88 | 62 | 85 | 65 | 82 | 68 |
| 66 | 52 | 94 | 56 | 91 | 59 | 88 | 61 | 86 | 64 | 83 | 67 | 80 | 70 |
| 64 | 56 | 91 | 58 | 88 | 62 | 85 | 65 | 82 | 67 | 81 | 69 | 78 | 72 |
| 62 | 59 | 88 | 62 | 85 | 64 | 83 | 67 | 80 | 69 | 79 | 71 | 76 | 74 |
| 75 | 63 | 84 | 65 | 83 | 67 | 80 | 69 | 78 | 71 | 77 | 73 | 74 | 75 |
| 46 | 91 | 57 | 90 | 59 | 90 | 58 | 90 | 59 | 89 | 60 | 89 | 59 | 89 |
| 46 | 90 | 59 | 89 | 59 | 90 | 59 | 89 | 59 | 89 | 60 | 89 | 60 | 88 |
| 58 | 90 | 59 | 89 | 59 | 89 | 60 | 88 | 60 | 89 | 60 | 88 | 61 | 87 |
| 47 | 89 | 59 | 89 | 59 | 89 | 60 | 88 | 61 | 88 | 61 | 87 | 61 | 87 |

TABLE-continued

| S1 | D1 | S2 | D2 | S3 | D3 | S4 | D4 | S5 | D5 | S6 | D6 | S7 | D7 |
|----|----|----|----|----|----|----|----|----|----|----|----|----|----|
| 47 | 89 | 59 | 89 | 60 | 88 | 61 | 87 | 61 | 87 | 62 | 86 | 63 | 85 |
| 47 | 88 | 61 | 87 | 61 | 87 | 62 | 86 | 63 | 85 | 64 | 84 | 65 | 83 |
| 48 | 87 | 61 | 87 | 62 | 86 | 63 | 85 | 64 | 84 | 65 | 83 | 66 | 82 |
| 48 | 87 | 62 | 85 | 63 | 85 | 65 | 83 | 65 | 83 | 67 | 81 | 67 | 82 |
| 64 | 85 | 63 | 85 | 64 | 84 | 65 | 82 | 67 | 82 | 67 | 81 | 68 | 79 |
| 49 | 85 | 64 | 83 | 66 | 82 | 67 | 81 | 68 | 80 | 69 | 79 | 70 | 78 |
| 50 | 83 | 66 | 82 | 66 | 82 | 68 | 79 | 69 | 79 | 71 | 77 | 72 | 75 |
| 51 | 81 | 68 | 79 | 70 | 78 | 71 | 76 | 73 | 76 | 73 | 74 | 75 | 73 |
| 52 | 79 | 70 | 78 | 71 | 77 | 72 | 75 | 74 | 74 | 75 | 73 | 77 | 70 |
| 53 | 77 | 71 | 76 | 73 | 76 | 74 | 73 | 76 | 72 | 78 | 69 | 80 | 68 |
| 53 | 77 | 72 | 74 | 75 | 74 | 76 | 72 | 77 | 71 | 78 | 69 | 81 | 66 |
| 54 | 75 | 74 | 71 | 78 | 72 | 78 | 69 | 80 | 68 | 82 | 65 | 84 | 63 |
| 55 | 73 | 76 | 70 | 79 | 70 | 80 | 68 | 81 | 66 | 84 | 63 | 87 | 60 |
| 56 | 71 | 78 | 69 | 81 | 67 | 83 | 64 | 85 | 63 | 87 | 60 | 89 | 58 |
| 57 | 69 | 80 | 68 | 82 | 65 | 84 | 63 | 87 | 61 | 89 | 58 | 92 | 55 |
| 58 | 67 | 82 | 66 | 84 | 63 | 87 | 60 | 89 | 58 | 93 | 54 | 96 | 51 |
| 59 | 65 | 85 | 63 | 86 | 60 | 90 | 58 | 92 | 55 | 96 | 51 | 99 | 47 |
| 75 | 63 | 87 | 61 | 89 | 57 | 93 | 55 | 95 | 51 | 100 | 47 | 103 | 43 |
| 62 | 60 | 90 | 57 | 93 | 53 | 97 | 50 | 100 | 47 | 104 | 42 | 109 | 37 |
| 80 | 57 | 92 | 55 | 95 | 51 | 100 | 47 | 103 | 44 | 108 | 37 | 116 | 38 |
| 66 | 52 | 97 | 51 | 100 | 46 | 105 | 41 | 110 | 36 | 116 | 29 | 101 | 0 |
| 67 | 50 | 101 | 46 | 105 | 41 | 110 | 36 | 115 | 31 | 123 | 21 | 104 | 0 |
| 70 | 45 | 106 | 40 | 111 | 34 | 119 | 27 | 128 | 14 | 255 | 0 | 0 | 0 |
| 73 | 40 | 110 | 36 | 116 | 30 | 128 | 16 | 143 | 0 | 0 | 0 | 0 | 0 |

The Table shows only 72 rows of data and rows 22 to 42 are omitted for convenience. The full data matrix for each of the five measuring locations 44 includes 200 rows, for the example used herein. In FIG. 2, some of the scan lines 43 go through the diameters of the spots 14. Some of the scan lines are between dots, and other scan lines go along short cords in the vicinity of the dot edges. As stated above, the camera magnifies the image and a large number of pixels receive energy through each of the dots 14. Accordingly, the numbers in the Table represent pixel counts for the spaces S1 through S7 and the dots D1 through D7. The diameters of the dots D1 through D7, therefore, can be determined by searching the rows of data of Table 1 for the highest pixel counts in the D columns. Pixel counts are provided 200 scan lines at each of the five scanning locations 44 and, therefore, a complete search requires investigating 1,000 rows of data. Many rows of data are known to be non-informative because many scan lines fall between rows of dots. Also, the panel 12 may be slightly skewed so that some of the scan lines might not cover seven of the dots 14. The present invention is directed to a method of identifying and measuring the diameters of the transparent elements 14, and the spaces between the elements, while avoiding processing pixel data received from scan lines which cannot contain useful information.

As the pixel counts for the scan lines 43 are applied to the computer 41, the computer arranges the data in the S and D columns shown in the Table. As is fully explained in U.S. Pat. No. 4,684,982 the computer 41 is programmed to arrange incoming data into the fourteen space and dot columns shown in the Table. In instances when there is a deficiency of pixel counts, because seven dots and seven spaces are not in the field of view, the reticon interface circuit 37 substitutes zeros for the missing pulse counts. Thus, as shown in row 1 of the Table, the D6, S7 and D7 columns contain zeros. In the Table, rows 1 through 8 have zeros in the D7 column, and accordingly, these rows cannot have been received from scan lines which contain useful measuring data. In the Table, lines 69 through 72 end in zeros. These rows, therefore, do not include useful data. With the invention, the D7 column is investigated for a preselected number of consecutive zeros, for example. As soon as a pixel count is detected in the D7 column, investigation of the column continues until the next succession of zeros is found, such as that starting at row 68. It is immediately known that rows 9 through 68 are pixel counts for scan lines which passed across one of the rows of transparent elements, and that one, or several, of these rows of data include the full diameter of the transparent dots 14.

Referring again to FIG. 2, some of the scan lines 43 cross small cords across the top or bottom of the transparent elements 14. These scan lines do not contain accurate dot or space measurements. For this reason an initial plurality and a final plurality or rows having pixel counts in the D7 column are eliminated in the data processing. For example, the first five rows (9 to 14 in the Table) and the last three, (66 to 68 in the Table) are from scans across the cords and can be eliminated. Also, the S1 and D1 columns of data are received from the beginning of each scan line. Because of the mechanical characteristics of the camera and galvo, and because the dots in the pattern are not vertically aligned, each scan line will typically begin in the middle of a space or dot. For this reason, these two columns are also eliminated. Accordingly, the data to be investigated has been reduced to that in columns S2 through D7 and rows 13 through 65. In the Table, row 43 shows pixel counts of approximately 90 for each of the D2 through D7 columns. Also, row 44 shows pixel counts very close to 90 for each of the D2 through D7 columns. These are the highest pixel counts in the data being investigated and are a measure of the dot diameter. Approximately 90 pixels of the detector where illuminated through the dots 14 and the diameter of the dots is known to be 90 pixels. The diameter of the dots 14 can be calculated merely by multiplying the pixel count by the known dimension of the pixel elements and dividing by the known magnification factor of the camera 17. Pixel count averaging adds accuracy to the calculation. FIGS. 2 and 3 show that every fourth dot receives a phosphor which luminesces with the same color of light. Thus, dots D2 and D5, for example, emit green light. For this reason, within each of the data rows 43 and 44, the pixel counts for the D2 and D5 columns are averaged in the measuring process. Similarly, the D3 and D6 pixel counts are averaged, as are the D4 and D7.

Figure 5A:
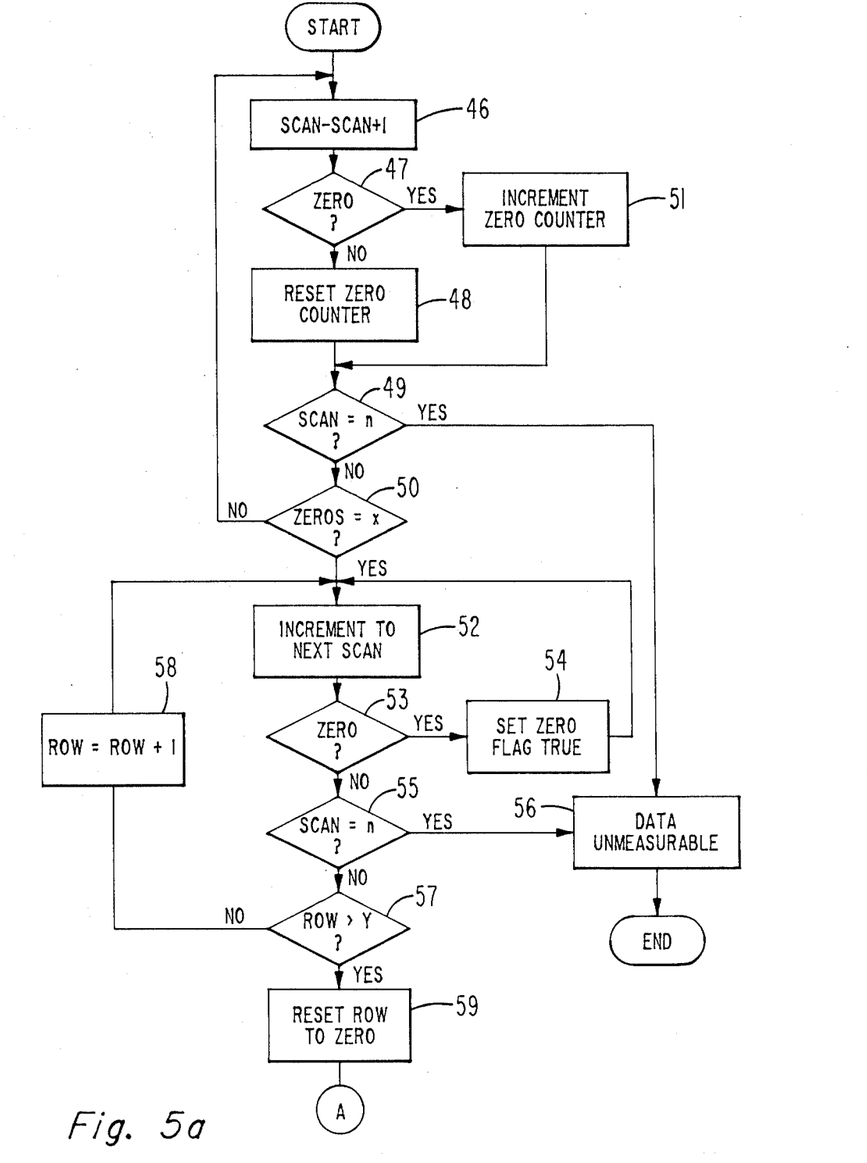
FIGS. 5a to 5c are a flow chart of a preferred embodiment.
Figure 5B:
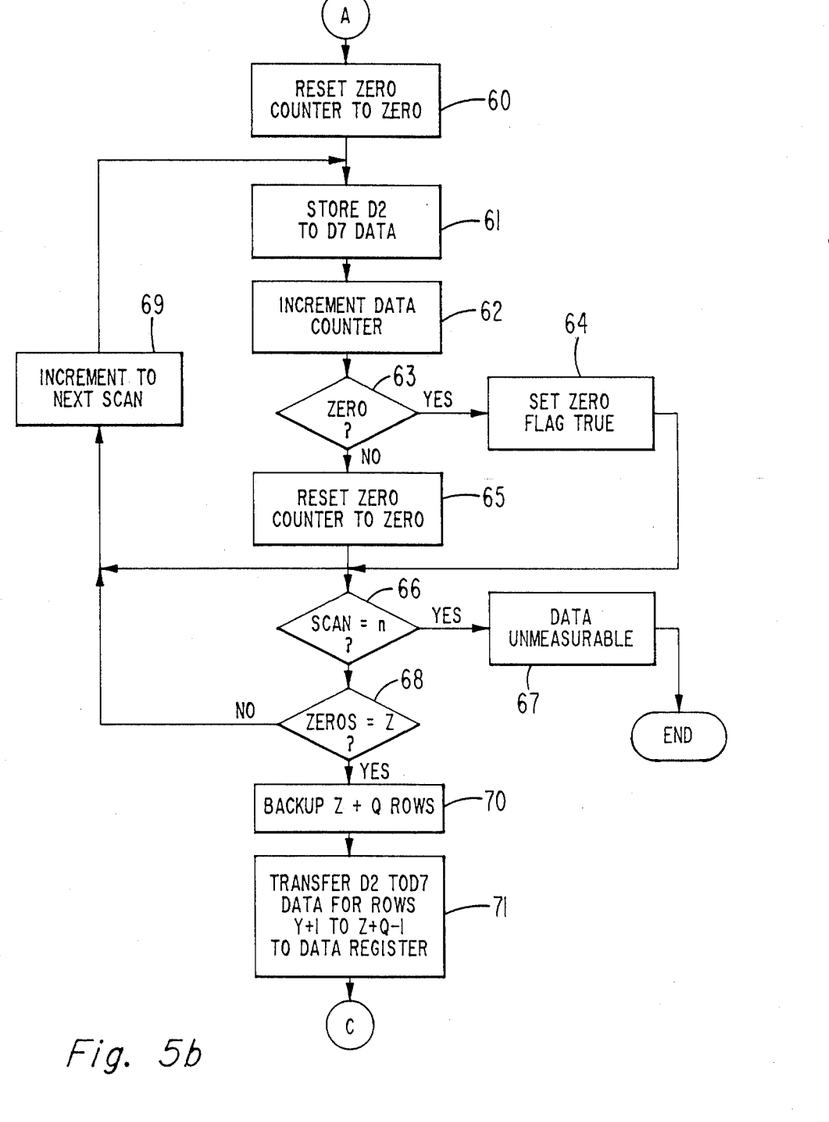
Figure 5C:
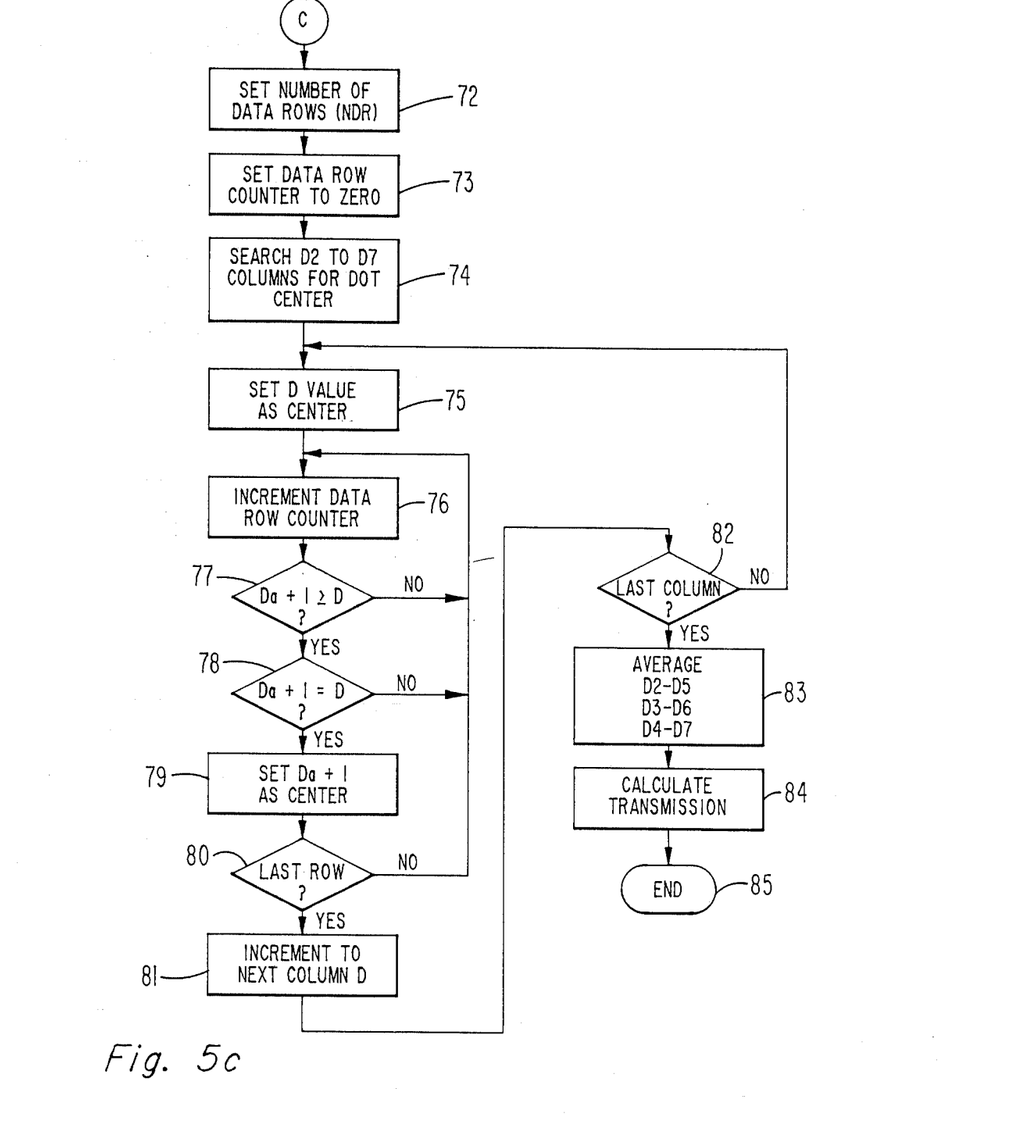

FIGS. 5a through 5c are a flow chart showing how the computer 41 is programmed to carry out the above-described inventive method. In FIG. 5a, data processing begins by considering the first data scanned at the column D7 at step 46. Decision 47 is entered to determine whether or not the first row has a zero in column 7. When the D7 pixel count reading is not a zero, step 48 is entered to reset the zero counter. Decision 49 is entered to determine whether or not the full number of scans has been considered. When they have, the data is not measurable and step 56 is entered and the routine is halted. When the full 200 scans has not been considered at decision 49, decision 50 is entered to determine whether or not five zeros have been consecutively detected. When less than five consecutive zeros have accrued, step 46 is reentered to consider the D7 data for the next scan line. At decision 47, when a zero is detected, step 51 is entered to increment the zero counter one count. Decisions 49 and 50 are entered to determine whether or not the selected number of consecutive zeros has been detected, five for the example selected. When the selected number of zeros has been detected in the D7 column, step 52 is entered to increment to the next scan. Decision 53 is then entered to determine whether or not the D7 column continues to contain a zero. When it does, the zero flag is set true at step 54 and increment step 52 is reentered. At decision 53, when the D7 column contains pixel count data, step 55 is entered to determine whether or not the full number of scans has been considered. When they have not, decision 57 is entered to determine whether or not pixel counts have been detected for a selected number of consecutive scan lines. The designation "scan" is now changed to "row" to distinguish scans having pixel counts in the D7 column from those having zeros in the D7 column. When a sufficient number of consecutive scans do not contain useful pixel counts in the D7 column, step 58 is entered to increment to the next row and step 52 is reentered. When the selected number of rows contain pixel counts in the D7 column, step 59 is entered to set the zero counter to zero. Step 60 is then entered to reset the zero counter to zero. The beginning of good data has now been located and step 61 is entered to store the dot data available in the D2 to D7 columns and also the space data in the S2 to S7 columns. Decision 63 is entered to see if zeros have begun to reappear in the D7 column. When they have not, step 65 is entered to reset the zero counter to zero and to increment to the next row at step 69 and to return to step 61. At decision 63, when a zero has been found in the D7 column, step 64 is entered to set the zero flag true. Decision 66 is then entered to determine whether or not the full number of scan lines has been investigated. When they have data unmeasurable, step 67 is entered to end the routine. At decision 66 when all scan lines have not been investigated, decision 68 is entered to determine whether or not another preselected sequence of zeros has reappeared in the D7 column. When such a sequence has not reoccurred, increment to next scan step 69 is entered to return to step 61. Thus, the routine sequentially investigates the pixel counts in the D7 column because the reappearance of a sequence zeros signifies that one full row of dots has been scanned. At decision 68 when a sequence of zeros has reappeared, step 70 is entered to backup selected number of rows. The rows investigated to detect the reappearance of a sequence of zeros in the D7 column must be eliminated. Also, the last several rows, i.e., three or five having pixel counts in the D7 column are eliminated. As mentioned above, this eliminates the scans which occur across cords at the bottoms of the transparent elements. Step 71 is entered to transfer the D2 to D7 pixel counts and the S2 to S7 pixel counts to the data register for consideration. Thus pixel counts for the first five and last three rows, and for S1 and D1 columns, are not considered.

At step 72, the number of data rows to be considered is set. This number is known because the scan lines are sequentially tracked as the D7 column is investigated for zeros and pixel counts. The number is set in accordance with the elimination of the starting and ending scans across cords of the dots.

At step 73, the row counter is set to zero. At step 74, the investigation of the columns begins. Thus, column D2, for all rows set at step 72, is investigated to find the highest pixel count in that column. When investigation of column D2 is completed, column D3 is investigated until all six columns are investigated. At step 75, an optimum dot diameter is set into the system. This value can be different for the various measuring arrays 44 because the dots can have different diameters at the corners and centers. The increment row counter step 76 is intended to increment to the next row. At step 77 when the detected diameter value is greater than the set diameter value, decision 78 is entered to check the next value to determine whether or not two large consecutive values have occurred. When they have not, the increment step 76 is reentered. When two consecutive large values have been detected, step 79 is entered to set the detected value at the center value. Decision 80 is then entered to determine whether or not all rows of data have been considered. When they have not, increment data row counter 76 is reentered. When all rows of data have been considered, step 81 is entered to increment to the next column of data. Thus, the D2 column pixel counts for all the rows are considered before the next column is considered. The system is incremented to the D3 column and all pixel readings in that column are considered. At decision 82, when the D7 column has not been considered, step 75 is reentered to reset the D value as the dot diameter. Also, at decision 82 when the D7 column has been considered, step 83 is entered to average the D2, D5 pixel counts, the D3, D6 pixel counts and the D4, D7 pixel counts. Step 84 is then entered to calculate the transmission of the matrix in any one of several well-known methods. The routine is then ended at step 85. The above description is related to a single row of dots. For each set of 200 scans as many as 20 dots can be scanned, and the processing is carried out on all of the rows of dots. Accordingly, the elimination of scans between dot rows, and across short cords, substantially reduces the amount of data which must be processed. The processing takes place for each of the five data measuring locations 44 shown in FIG. 4. The invention therefore substantially increases the speed at which the pixel count data are processed.

What is claimed is:

1. A method of measuring the dimensions of, and spaces between, transparent elements arranged in pattern in an opaque medium including the steps of:
   (a) placing said medium between an energy source and an array of pixels responsive to said energy and illuminating said medium with said energy;
   (b) scanning said energy across said array in a plurality of scan lines whereby pixels receiving energy passing through said transparent elements charge to a first charge level and pixels shaded by said medium charge to a second charge level;

(c) detecting said charge levels and producing an analog signal having amplitude levels indicative of said charge levels and pulse widths indicative of a dimension of said transparent elements and of said spaces between said elements;

(d) converting said analog signal to a digital signal having first and second pulse levels in accordance with said amplitude levels, whereby said dimensions are represented by pixel counts;

(e) transferring said pixel counts for a selected number of said transparent elements, and for an equal number of spaces between said elements, to a storage means, and transferring zeros to said storage means where the number of transparent elements is less than said selected number;

(f) storing said pixel counts in a matrix wherein the pixel counts for each of said scan lines form a row and the pixel counts of said transparent elements and each of said spaces are aligned as columns, one of said columns having a succession of zeros when the number of transparent elements is less than said selected number; and (g) successively investigating said one column for zeros and rejecting rows having one of said zeros is said one column, and accepting rows having a pixel count in said one column.

2. The method of claim 1 further including the step of investigating said one column until a succession of pixel counts if followed by a plurality of zeros.

3. The method of claim 2 further including the step of disregarding the first n rows having a pixel count in said one column and the last m rows having a pixel count in said one column.

4. The method of claim 3 further including the step of investigating said pixel counts in said rows and using the highest of said pixel counts to identify said dimension of said transparent elements.

5. The method of claim 4 wherein said dimension is identified by high, substantially equal, pixel counts in the same column in at least two successive rows.

6. The method of claim 5 further including the step of measuring the dimension of three light transparent elements in the row containing said high pixel counts, by averaging the pixel counts in every fourth column.

7. The method of claim 6 wherein pixel counts for $\chi$ of said transparent elements and, $\chi$ of said spaces, are transferred to said storage means and, the pixel count for at least one of said columns is disregarded.

8. The method of claim 7 wherein the first transparent element scanned, and the first space scanned, are disregarded.

9. The method of claim 1 further including the step of investigating said pixel counts in said rows and using the highest of said pixel counts to identify said dimension of said transparent elements.

10. The method of claim 9 wherein said dimension is identified by high, substantially equal, pixel counts in the same column in at least two successive rows.

11. The method of claim 10 further including the step of disregarding the first n rows having a pixel count in said one column and the last m rows having a pixel count in said one column.

* * * * *